July 14, 1953   C. G. BRANSTRATOR ET AL   2,645,504
FOLDABLE STEP ASSEMBLY FOR HOUSE TRAILERS
Filed Nov. 4, 1949
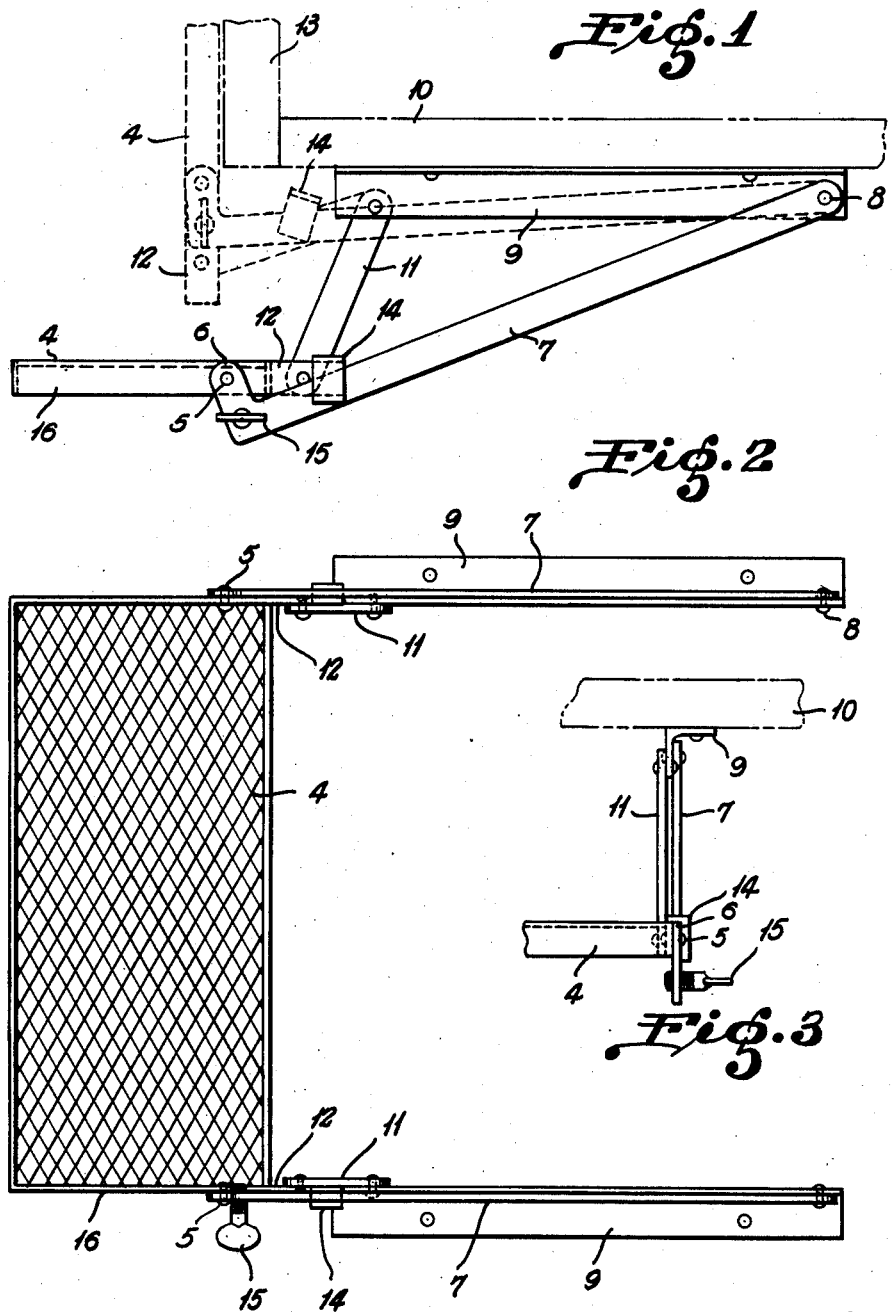
INVENTORS
CLEM G. BRANSTRATOR
WAYNE R. BRANSTRATOR
BY
ATTORNEY Patented July 14, 1953

2,645,504

UNITED STATES PATENT OFFICE 2,645,504

FOLDABLE STEP ASSEMBLY FOR HOUSE TRAILERS

Clem G. Branstrator and Wayne R. Branstrator, Fort Wayne, Ind.

Application November 4, 1949, Serial No. 125,426

12 Claims. (Cl. 280—166)

This invention relates to improvements in a foldable step assembly preferably adapted for use on a house trailer for automobiles and the like.

Ordinarily, foldable step assemblies have been devised and so constructed as to have sliding movement beneath the vehicle to which they are attached. Step assemblies of this character accumulate mud, ice and debris from the roadway which causes clogging of the movable parts and thereby prevents free movement thereof when adjusting the step to operable or folded positions.

An important object of the invention is to provide a unique step assembly comprising a step and supporting means therefor so that accumulations of foreign matter or debris will not create interference when the step is manipulated to an operative substantially horizontal position or to an inoperative substantially vertical position.

A particular object of the invention is to provide a step assembly which can be easily and quickly manipulated, including a novel locking means whereby the step can be held in the inoperative position referred to.

Other objects and advantages of the invention will appear after the following description is considered in conjunction with the drawings annexed hereto.

An illustrative embodiment of the invention is shown in the accompanying drawings, in which:

Figure 1 is an end elevational view showing a step structure in connection with a vehicle in unfolded position for use;

Figure 2 is a bottom plan view of the step and its supporting members; and

Figure 3 is a fragmentary detail view, in which the locking means for the step is shown.

The illustrative embodiment of the invention includes a step 4 supported on pivots 5 on the upturned ends 6 of corresponding parallel beam members 7 which are pivotally connected by pivots 8, to corresponding supports or fittings preferably in the form of angle-irons 9 that underlie and are secured to a floor 10 of a house trailer or other vehicle.

Corresponding links 11 are connected at their ends respectively to the angle-irons 9 and arms or continuations 12 that extend rearwardly from the ends of the step structure 4, whereby the step is swung upon the pivots 5 as the beams 7 are moved upwardly, causing the step to assume a substantially vertical inoperative position so as to overlap the door 13 of the trailer, as shown in Figure 1.

Another object of the invention is to provide a step assembly comprised of a minimum number of components which can be economically manufactured and assembled on a production basis.

Additional objects of the invention reside in its simplicity of design and construction, ease of operation, balance and stability.

One of the beams 7 is provided with a stop 14 having a portion of which overlies the corresponding arm 12 on the step structure by which tilting movement of the step is limited in one direction and thus held in a substantially horizontal operative position. In the distal end of one of the beams 7, adjacent the corresponding upturned end 6 thereof is disposed a lock-screw 15 that has engagement with the adjacent end of the rectangular frame 16 of the step 4 by which said step is secured in a selected position.

It is to be understood that the step 4 may be designed and constructed as desired, and as exemplified herein, includes the frame 16, and a grille-like member which is anchored to the sides and ends or rails of the frame. The thickness of the step or tread is substantially uniform and determined by the width of the strip stock used in making the frame. It should also be noted that the beams and links are also made from strip stock and that these members and the supports are designed and constructed to promote standardization and economy in manufacture and assembly. Moreover, it will be noted that the opposite ends of the links 11 are secured to the inner sides of the arms or continuations 12 and to inner sides of the outer ends of the depending portions of the supports 9, whereas the upper ends of the beams are pivotally connected to the outer sides of the inner ends of the depending portions of the supports and their lower ends to the ends of the frame 16 at points spaced forwardly of the points of pivotal connections between the links and arms. Thus, two pairs of separate disconnected but coacting members are utilized to suspend the step from its supports. It is to be noted that all of the connections between the beams and links step are so located that the upper surface of the tread is free of all obstructions, thereby promoting safety.

Operation

Preferably, the various parts of the device are assembled to form a unit comprised of the anchor angle-irons 9, step 4, beams 7, links 11 and the lock-screw 15 so that the unit may be readily attached to any mounting such as the underside of the floor 10 adjacent the car door 13 in readiness for use. After securing the unit to the trailer floor or its supporting members, the step may readily be unfolded by releasing the lock-screw and swinging the step down into position for use in entering the trailer, or, folded up out of the way in front of the trailer door where it may be held by use of the lock-screw.

An advantage of the invention is that its operation is carried out without interference of accumulations of debris that ordinarily encumbers devices that require sliding movement.

Variations from the particular construction above disclosed may be resorted to by the exercise of skill in the art, without departure from the spirit or scope of the invention.

What we claim is:

1. A unitary attachment for a house trailer comprising a folding step, a support for said step consisting of angle-irons attached to the floor of the trailer, beams pivotally connected to said angle-irons provided with upturned ends to which said step is pivotally connected, rearwardly extending arms on said step, links pivotally connected at their opposite ends respectively to the angle-irons and rearwardly extending arms, and stops on said beams having engagement with the arms on said step to limit unfolding movement of the step.

2. A foldable step unit for a house trailer having a door comprising a unit including angle-irons attached to the bottom of the floor of the trailer, beams pivotally connected to said angle irons provided with upturned ends, a step having a frame pivotally supported between said upturned ends, the frame of said step having rearwardly extending arms, links pivotally connected at their opposite ends to said angle-irons and the arms on the frame of said step, and stops on said beams having portions thereon that overhang said arms by which tilting movement of said step is limited in one direction, said step when in folded position being adapted to overlap the door of said trailer.

3. An attachment for a house trailer having a door comprising angle-irons secured to the bottom of the trailer body, beams pivotally secured to said angle-irons extending outwardly, a step structure pivotally connected to the outer ends of said beams, stops on said beams engageable with said step structure to limit tilting movement thereof, and links pivoted on said angle-irons and step structure whereby said step structure may be moved so as to overlap the door of the trailer when said beams and links are moved into folded position.

4. A step assembly of the kind described comprising a pair of elongated fittings for attaching the assembly to a mounting, a step, a pair of separate beams having upper ends connected to the rearward extremities of the fittings and lower ends connected to opposite sides of the step, a pair of separate links shorter in length than the beams having upper ends connected to the forward extremities of the fittings and lower ends connected to the said opposite sides of the step at points spaced rearwardly from the connections between the beams and step, and means for maintaining the step in an operative position.

5. A step assembly of the kind described comprising a step of substantially uniform thickness, a pair of beams having lower ends pivotally connected to opposite sides of the step and upper ends formed for pivoted connection with a mounting, a pair of links shorter in length than the beams having lower ends pivotally connected to the said opposite sides of the step at points rearward of the pivoted connections between the beams and step and having upper ends formed for pivotal connection with a mounting, means for maintaining the step in a substantially horizontal position, and means whereby the step can be locked in a substantially vertical position.

6. A step assembly of the kind described comprising a step of substantially uniform thickness having end rail members, a pair of elongated fittings for attaching the assembly to a mounting, a pair of separate links having their lower ends pivotally connected to the inner sides of the end rail members and their upper ends pivotally connected to the inner sides of the forward ends of the fittings, a pair of separate beam members having their lower ends pivotally connected to the outer sides of the end rail members at points in advance of the pivotal connections between the links and step and their upper ends pivotally connected to the outer sides of the rearward ends of the fittings, means on certain of the members being engageable with the other members for maintaining the step in a horizontal operative position, the arrangement being such that when the step is lifted upwardly a sufficient distance it will be caused to assume a substantially vertical inoperative position, and means whereby the step can be locked in the inoperative position.

7. A step assembly of the kind described comprising a step, said step including a frame having side rails and end rails, a grille constituting a tread secured to the frame, said end rails having rearwardly extending members, a pair of links for supporting the step pivotally connected to the extending members, a pair of beam members for supporting the step pivotally connected to the end rails at points in advance of the connections between the links and extending members, and means on one pair of members for engaging the other pair of members for maintaining the step in an operative position when the links and beam members are attached to a mounting.

8. A step assembly of the kind described comprising a pair of elongated fittings for attaching the assembly to the underside of a mounting, a step of substantially uniform thickness having rearwardly extending members, a pair of links having lower ends pivotally connected to the inner sides of the extending members and upper ends pivotally connected to the forward extremities of the fittings, a pair of beam members having offset lower ends pivotally connected to opposite sides of the step and upper ends pivotally connected to the rearward extremities of the fittings, means on one pair of the members for engaging the other pair of members to hold the step in a substantially horizontal position, said step being swingable to a substantially vertical inoperative position to place the offset portions of the beam members in coextensive relationship with the extending members, and means for locking the step in the inoperative position.

9. A step assembly of the kind described comprising a pair of elongated fittings for attaching the assembly to a mounting, a step, a pair of separate beams having upper ends connected to the rearward extremities of the fittings and lower ends connected to opposite sides of the step, and a pair of separate links shorter in length than the beams having upper ends connected to the forward extremities of the fittings and lower ends connected to the said opposite sides of the step at points spaced rearwardly from the connections between the beams and step.

10. A step assembly of the kind described comprising a step of substantially uniform thickness, a pair of beams having lower ends pivotally connected to opposite sides of the step and upper ends formed for pivoted connection with a mounting, a pair of links shorter in length than the beams having lower ends pivotally connected to the said opposite sides of the step at points rearward of the pivoted connections between the beams and step and having upper ends formed for pivotal connection with a mounting.

11. A step assembly of the kind described comprising a step of substantially uniform thickness having end rail members, a pair of elongated fittings for attaching the assembly to a mounting, a pair of separate links having their lower ends pivotally connected to the inner sides of the end rail members and their upper ends pivotally connected to the inner sides of the forward ends of the fittings, a pair of separate beam members having their lower ends pivotally connected to the outer sides of the end rail members at points in advance of the pivotal connections between the links and step and their upper ends pivotally connected to the outer sides of the rearward ends of the fittings, and means on certain of the members being engageable with the other members for maintaining the step in a horizontal operative position.

12. A step assembly of the kind described comprising a step, said step including a frame having side rails and end rails, a grille constituting a tread secured to the frame, a pair of link members for supporting the step pivotally connected to the step, a pair of beam members for supporting the step pivotally connected to the end rails at points in advance of the connections between the link members and step, and means on one pair of members for engaging the other pair of members for maintaining the step in an operative position when the link members and beam members are attached to a mounting.

CLEM G. BRANSTRATOR.
WAYNE R. BRANSTRATOR.

References Cited in the file of this patent
UNITED STATES PATENTS

| Number | Name | Date |
|---|---|---|
| 1,182,563 | Hild et al. | May 9, 1916 |
| 2,122,040 | Machovec | June 28, 1938 |
| 2,324,507 | Johnson | July 20, 1943 |
| 2,436,961 | Gabriel | Mar. 2, 1948 |